Patented Aug. 14, 1945

2,382,812

UNITED STATES PATENT OFFICE 2,382,812

PHOSPHORUS CONTAINING PLASTIC POLYMERS FROM 1,3-DIENES

Joseph Lloyd Parker, Louisville, Ky., assignor to E. I. du Pont de Nemours & Company, Wilmington, Del., a corporation of Delaware No Drawing. Application August 15, 1942, Serial No. 454,986

14 Claims. (Cl. 260—86.5)

This invention relates to the rubber-like polymeric materials derived from 1,3-dienes and to a method for obtaining these polymers in plastic and readily processed form.

Many patents have been directed toward obtaining plastic polymers of 1,3-dienes, such as 1,3-butadiene and chloroprene (2-chloro-1,3-butadiene), using the technically advantageous process of polymerizing in aqueous dispersion. A number of practical processes for obtaining these results have been developed. Almost all of these processes, however, in which products of high plasticity are formed, involve the use of sulfur or a sulfur compound, such as an organic mercaptan or hydrogen sulfide, and hence the resulting plastic product contains chemically combined sulfur. This is a disadvantage for certain applications, for example when the material is to be used in contact with metals which readily form sulfides under these conditions, such as silver.

It is an object of the present invention to prepare new plastic polymers from 1,3-dienes. Another object is to prepare polymers of 1,3-dienes having any desired plasticity. A further object is to prepare sulfur-free polymers of 1,3-dienes. Another object is to prepare 1,3-diene polymers containing combined phosphorus. Other objects will appear hereinafter.

These objects are accomplished by polymerizing a 1,3-butadiene hydrocarbon or a haloprene in the presence of a compound of the general formula:

in which $R_1$ is a hydrocarbon radical and $R_2$ is either a hydrocarbon radical or hydrogen. The polymerization is preferably carried out in aqueous emulsion.

In order that the process may be more fully understood, the following specific examples are given by way of illustration, but the invention is not limited thereto as will become more apparent hereinafter.

Example I

One hundred parts of chloroprene containing 0.4 part of monobutyl phosphine was emulsified in 178 parts of water containing 1.9 parts of acetic acid, 4 parts of sodium salt of sulfated oleyl acetate, 0.5 part of a sodium salt from the dinaphthyl methane sulfonic acids prepared according to U. S. Patent No. 1,336,579. The polymerization was carried out for 2.6 hours at 40° C. The dispersion was then treated with 2 parts of an antioxidant consisting of a mixture of phenyl alpha-naphthylamine and diphenylamine dispersed in a solution of the above sodium salts and was coagulated by the addition of sodium chloride solution. The coagulum was then washed upon a corrugated mill for twenty minutes with water to remove the salt and the dispersing agents and dried by milling on a warm smooth mill. There resulted 95 parts of a plastic polymer resembling uncured natural rubber. When this was compounded with 2% of phenyl alpha-naphthylamine, 10% of magnesium oxide, 5% of wood rosin, 36% of reinforcing carbon black, and 5% of zinc oxide (all these percentages are based on the weight of polymer) and cured 60 minutes at 60 pounds steam pressure, a strong, elastic, resilient vulcanizate resembling vulcanized natural rubber resulted, which had a tensile strength of 3440 pounds per sq. in. and an elongation at break of 515 per cent.

Example II

One hundred grams of chloroprene containing 0.4 part of monobutyl phosphine and 4 parts of rosin was emulsified in 170 parts of water containing 0.8 part of sodium hydroxide, 0.5 part of ammonium persulfate and 0.5 part of the dinaphthyl methane sodium sulfonate used in Example I. The sodium hydroxide was sufficient to neutralize the rosin with the formation of the dispersing agent, sodium abietate, and leave an excess of sodium hydroxide. The polymerization was carried out at 40° C. for six hours. The dispersion was then treated with 2 parts of the antioxidant of Example I dispersed in a mixture of sodium abietate and the dinaphthyl methane sodium sulfonate. The stabilized dispersion was acidified with acetic acid, coagulated by the addition of sodium chloride solution, and then washed and dried as in Example I. There resulted 91 parts of a polymer similar to that obtained in Example I but more plastic. When this was compounded and cured like the product of Example I except that no rosin and only 4 parts of magnesium oxide were used, the vulcanizate was similar to that obtained in Example I, the tensile strength being 3010 pounds per sq. in. and the elongation at break 516 per cent.

Example III

One hundred grams of chloroprene containing only 0.2 part of monobutyl phosphine was polymerized and worked up exactly as in Example II. The product was somewhat less plastic than the product of Example I, but its vulcanizate had a tensile strength of 4060 pounds per sq. in. and an elongation at break of 540 per cent.

*Example IV*

One hundred parts of chloroprene containing 0.4 part of dibutyl phosphine was polymerized as in Example II except that the polymerization time was 12 hours. The dry product obtained as in the preceding examples in 85% yield was similar in plasticity to the product of Example III.

*Example V*

One hundred parts of chloroprene containing 0.2 part of monophenyl phosphine was polymerized as in Example I except that the polymerization time was 1.25 hours and the yield 94%. The product was similar to that obtained in Example IV.

*Example VI*

One hundred parts of 1,3-butadiene containing 0.5 part of monophenyl phosphine and 4 parts of oleic acid was dispersed and polymerized in 150 parts of water containing 1.08 parts sodium hydroxide, 1 part of ammonium persulfate and 1 part of the dinaphthylmethane sodium sulfonate described in Example I. The sodium hydroxide used was sufficient to neutralize the oleic acid with the formation of the dispersing agent, sodium oleate, and leave an excess of sodium hydroxide. Emulsification and polymerization were brought about by placing the ingredients in sealed glass tubes which were rotated end for end in a bath at 40° C. for 64 hours. At the end of this time the resulting dispersion was treated with 2.5 parts of the antioxidant mixture used in Example I and was coagulated by acidification with acetic acid and the addition of sodium chloride solution. The coagulum was washed and dried as in the preceding examples, yielding 72 parts of a plastic polymer.

*Example VII*

Sixty parts of chloroprene and 40 parts of 1,3-butadiene containing 0.3 part of monobutyl phosphine were emulsified and polymerized as in Example II using the apparatus of Example VI. After 16 hours at 40° C. the dispersion was worked up as in Example II yielding 81 parts of a soft, plastic interpolymer of chloroprene and butadiene.

Although for the purpose of illustration the above examples are limited to the butyl and phenyl phosphine, the invention includes the use of any phosphine in which one or two of the hydrogen atoms are replaced by hydrocarbon radicals. These radicals may be either aliphatic, aromatic, or hydroaromatic and may have either straight or branched chains or one or more rings in any combination. Ordinarily, the lower members of each series are preferred, that is, those containing not more than ten carbon atoms. Examples of suitable phosphines are methyl phosphine, ethyl phosphine, propyl phosphine, decyl phosphine, dimethyl phosphine, diethyl phosphine, didecyl phosphine, etc.; isopropyl phosphine, (methyl-2, ethyl-3) butyl phosphine, cyclohexyl phosphine, naphthyl phosphine, tolyl phosphine, diphenyl phosphine, etc. As illustrated in the examples, 0.2 to 0.4% of the phosphine used therein is usually sufficient to produce a polymer of good plasticity. As little as 0.1%, however, produces a noticeable effect and is useful in some cases. On the other hand, when a very plastic polymer is desired 1% or more may be used. Even larger quantities up to 3% are useful in producing semi-solid and viscous polymers. No precise figures can be given, however, which are accurate in all cases for the production of polymers of a definite plasticity since, as illustrated in the examples, monophenyl phosphine is more effective than the same weight of monobutyl phosphine which in turn is more effective than dibutyl phosphine and the effect of monobutyl phosphine is greater in alkaline than in acid emulsion. It is also possible to supplement the action of the phosphine by the use of other compounds already disclosed as producing plastic or plasticizable polymers when present during the polymerization of the dienes, such as sulfur, as described for chloroprene in U. S. Patent No. 2,234,215 and for butadiene in U. S. Patent No. 2,234,204, hydrogen sulfide as disclosed for chloroprene in U. S. Patent No. 2,163,250 and mercapto compounds as disclosed for chloroprene in U. S. Patent No. 2,227,417. When, however, the polymer is to be used in contact with tarnishable metals, the introduction of sulfur into the polymer is not recommended.

The present invention is, of course, not limited to the above examples but may be practiced in any of the ways which have already been described in the prior art. Thus, such variations as the concentration and type of emulsifying agent, the hydrogen ion concentration of the dispersion and the ratio of the aqueous to non-aqueous phase are not critical and may be varied in any known or obvious manner, although the conditions used in the above examples illustrate some of the preferred embodiments. Likewise, the temperature of polymerization may be varied, with effects which have already been described. Suitable temperatures have been found to lie between 10 and 45° C. and the preferred temperatures between about 30 and about 45° C. The same methods may be used for dispersing the polymerizable material in the emulsifying solution, for isolating the finished polymer from the dispersion, and for drying it and stabilizing it against oxidation and aging as have already been described for the preparation of other polymers of 1,3-butadiene and of chloroprene in aqueous dispersion. The polymerization may be accelerated, if desired, by the use of catalysts, such as persulfates, ferricyanides, or by inorganic peroxides, perborates, percarbonates and similar reagents.

Suitable 1,3-dienes for the practice of the invention are the conjugated 1,3-butadiene hydrocarbons, such as 1,3-butadiene, isoprene and 2,3-dimethyl-1,3-butadiene and the haloprenes, such as chloroprene and bromoprene (2-bromo-1,3-butadiene) or mixtures of two or more of 1,3-dienes. It is often advantageous, particularly in the case of the 1,3-butadiene hydrocarbons, to polymerize in the presence of one or more other members of the class consisting of vinyl and vinylidene compounds. Such compounds have, in general, the formula:

wherein A is a negative radical, e. g., chlorine, aryl, vinyl, cyano, acyl, acyloxy, aryloxy, carboalkloxy, carboaryloxy, carboxy, etc., and B is either hydrogen, an aliphatic hydrocarbon radical, e. g., alkyl and cycloalkyl, or a negative radical. Examples of such compounds are styrene, vinyl chloride, methyl methacrylate, vinyl acetate, vinyl propionate, vinyl thioacetate, ethyl methacrylate, cyclohexyl methacrylate, cyclohexyl phenyl methacrylate, acrylonitrile, methacrylonitrile, methacrylic acid, methacrylamide, methacrylic anilide, vinyl butyrate, N-alkyl methacrylamides, N-alkylacrylamides, vinyl acrylate, ethyl acrylate, butyl methacrylate, octyl methacrylate, dodecyl methacrylate, methyl vinyl ketone, ethyl vinyl ether, butyl vinyl ether, etc.

If desired, the effect of the antioxidant in preserving the polymer against aging may be supplemented by the addition of the compounds disclosed in U. S. Patents Nos. 2,259,122, 2,234,203, and 2,234,211. As disclosed above, where the polymer is to be used in contact with a tarnishable metal, the presence of sulfur compounds (particularly the thiuram disulfides) is undesirable and this should be considered in the choice of the stabilizing agent.

The products of the present invention are plastic materials resembling uncured natural rubber. They can be compounded with materials known in the art for compounding natural rubber of those materials known in the art for compounding polychloroprene. The plastic polychloroprene products, either compounded or uncompounded, can be cured by the action of heat alone to elastic products resembling cured natural rubber. All of the plastic products can be cured to elastic products resembling cured natural rubber by the conventional curing processes for natural rubber.

It is apparent that many widely different embodiments of this invention may be made without departing from the spirit and scope thereof, and, therefore, it is not intended to be limited except as indicated in the appended claims.

I claim:

1. A process for making a plastic material resembling uncured natural rubber which comprises polymerizing a 1,3-diene of the class consisting of 1,3-butadiene hydrocarbons and haloprenes in aqueous emulsion in the presence of from 0.1 to 3.0 per cent, based on the weight of the polymerizable material, of a compound of the formula

wherein $R_1$ is a hydrocarbon radical and $R_2$ is a member of the group consisting of hydrogen and hydrocarbon radicals.

2. A process for making a plastic material resembling uncured natural rubber, which comprises polymerizing a mixture of a 1,3-diene of the class consisting of 1,3-butadiene hydrocarbons and haloprenes and a member of the group consisting of vinyl and vinylidene compounds in aqueous emulsion in the presence of from 0.1 to 3.0 per cent, based on the weight of polymerizable material, of a compound of the formula

wherein $R_1$ is a hydrocarbon radical and $R_2$ is a member of the group consisting of hydrogen and hydrocarbon radicals, the 1,3-diene being the preponderant polymerizable material.

3. A process for making a plastic material resembling uncured natural rubber which comprises polymerizing 2-chloro-1,3-butadiene in aqueous emulsion in the presence of from 0.1 to 3.0 per cent, based on the weight of polymerizable material, of a compound of the formula

wherein $R_1$ is a hydrocarbon radical and $R_2$ is a member of the group consisting of hydrogen and hydrocarbon radicals.

4. A process for making a plastic material resembling uncured natural rubber which comprises polymerizing 2-chloro-1,3-butadiene in aqueous emulsion in the presence of from 0.1 to 3.0 per cent, based on the weight of polymerizable material of monophenyl phosphine.

5. A process for making a plastic material resembling uncured natural rubber which comprises polymerizing 2-chloro-1,3-butadiene in aqueous emulsion in the presence of from 0.1 to 3.0 per cent, based on the weight of polymerizable material, a monobutyl phosphine.

6. A process for making a plastic material resembling uncured natural rubber which comprises polymerizing 1,3-butadiene in aqueous emulsion in the presence of from 0.1 to 3.0 per cent, based on the weight of polymerizable material, of a compound of the formula

wherein $R_1$ is a hydrocarbon radical and $R_2$ is a member of the group consisting of hydrogen and hydrocarbon radicals.

7. A process for making a plastic material resembling uncured natural rubber which comprises polymerizing 1,3-butadiene in aqueous emulsion in the presence of from 0.1 to 3.0 per cent, based on the weight of polymerizable material, of monophenyl phosphine.

8. A process for making a plastic material resembling uncured natural rubber which comprises polymerizing 1,3-butadiene in aqueous emulsion in the presence of from 0.1 to 3.0 per cent, based on the weight of polymerizable material, of monobutyl phosphine.

9. A phosphorus containing product made by the process of claim 1.

10. A phosphorus containing product made by the process of claim 2.

11. A phosphorus containing product made by the process of claim 3.

12. A phosphorus containing product made by the process of claim 4.

13. A phosphorus containing product made by the process of claim 6.

14. A phosphorus containing product made by heat curing the product made by the process of claim 3.

JOSEPH LLOYD PARKER.

CERTIFICATE OF CORRECTION.

Patent No. 2,382,812. August 14, 1945.

JOSEPH LLOYD PARKER.

It is hereby certified that error appears in the printed specification of the above numbered patent requiring correction as follows: Page 2, second column, line 73-74, for "carboalkloxy" read --carboalkyloxy--; page 3, first column, line 17, for "disclosed" read --discussed--; and second column, line 29, claim 5, for "a" before "monobutyl" read --of--; line 65, claim 14, after the word "containing" insert --elastic--; and that the said Letters Patent should be read with this correction therein that the same may conform to the record of the case in the Patent Office.

Signed and sealed this 20th day of November, A. D. 1945.

(Seal)

Leslie Frazer
First Assistant Commissioner of Patents.